Aug. 19, 1958 V. A. MOCAS 2,848,527
COVER FOR STORAGE BATTERY
Filed March 8, 1956
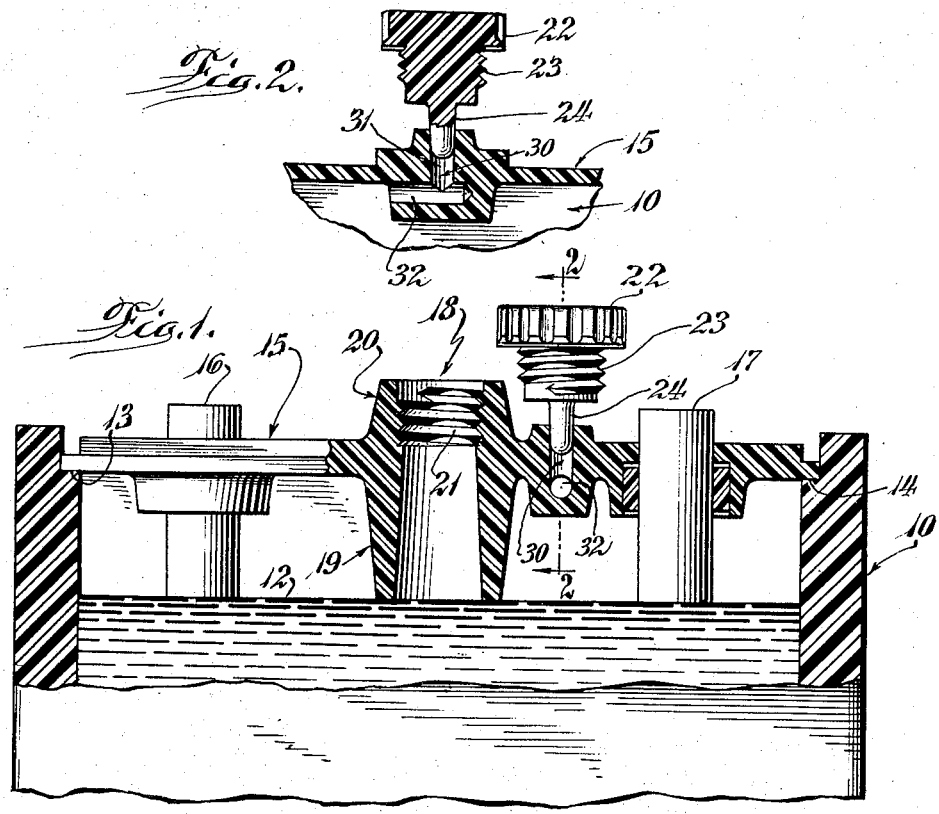
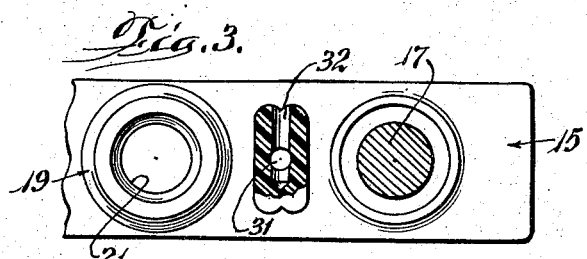
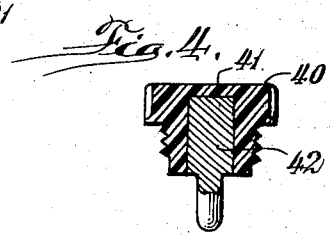

United States Patent Office 2,848,527
Patented Aug. 19, 1958

2,848,527

COVER FOR STORAGE BATTERY

Verlin A. Mocas, Elmhurst, Ill., assignor to The Richardson Company, Melrose Park, Ill., a corporation of Ohio Application March 8, 1956, Serial No. 570,296

3 Claims. (Cl. 136—177)

This invention relates to a storage battery and more particularly to a new and improved cover for the same.

In the normal storage battery one or more individual cells are provided, containing plates, separators and electrolyte. The cell cover, which is sealed in place, is provided with a filling well through which electrolyte or water may be poured into the cell. One problem which occurs in filling such a cell with electrolyte is that of overfilling the cell.

Another problem concerned with cover structure is that of providing an adequate vent in the cover whereby gases created in the cell may be discharged to the atmosphere without allowing electrolyte to pass through the vent.

Accordingly, it is one of the main objects of this invention to provide a battery cell cover structure which will permit electrolyte or distilled water to be added to a cell up to a predetermined level without overfilling the cell.

Another object is to provide a tortuous vent which will allow egress of gases from a battery cell and at the same time offer obstructions to the escape of electrolyte.

The foregoing objects are accomplished by means of a cell cover having a filling well extending downwardly from a filling opening, a special cap for the well and a separate vent extending through the cover. The cap is provided with an elongated extension depending from the bottom thereof which is adapted to be inserted into the outer vent opening after the cap is disengaged from the filling well. When the cell is to be filled with electrolyte or distilled water, the cap is removed from the filling well and its elongated extension is inserted into the vent opening thereby sealing the same from the atmosphere. The cover is of such a construction that electrolyte can readily be poured into the cell of the battery but only up to the bottom of the filling well by reason of the entrapment of air between the upper level of the electrolyte and the under side of the cover. Excess electrolyte will therefore rise in the filling well indicating that the cell has been filled to the desired level.

In the accompanying drawings:

Figure 1 is a vertical view, partly in section, of the upper part of a battery cell.

Figure 2 is a cross section of a cell cover taken along line 2—2 of Figure 1.

Figure 3 is a bottom view of a part of the cover for a cell.

Figure 4 is a cross section of a modified cap which may be used with the present invention.

Turning now to the drawing, there is indicated generally by the numeral 10 a portion of the case of a battery containing electrolyte whose upper level is designated by the numeral 12. The case is provided with inwardly extending ledges 13 and 14 which are adapted to support a cover 15.

Extending through cover 15 are plate terminals 16 and 17 for making external connections to the plates of the cell disposed in the cell cavity beneath the electrolyte.

Cover 15 is provided with an electrolyte filling well, indicated generally by the numeral 18, the filling well comprising, in the main, an annular skirt 19 surrounding a circular opening and extending downwardly from the cover into the cavity of the cell. In the particular cover construction shown there is also provided an upward extension of skirt 19 in the form of an annular protuberance 20. The inner surface of protuberance 20 is provided with threads 21.

A cap 22 having external threads 23 is adapted to be threadably engaged in the filling well to seal the same after electrolyte (or distilled water) has been added to the cell. The cap is also provided with a slender cylindrical-like elongated extension or pin 24 depending from the bottom thereof whose configuration is such that it may be inserted into and form a relatively tight fit with the outer opening of a vent described immediately hereinbelow.

Extending through the cover is a vent 30 adapted to permit the escape of gases formed in the cell. The preferred construction of this vent 30 is more clearly indicated in Figure 2 of the drawing. In this figure it will be seen that the vent is formed of two hollow tube-like sections which are interconnected to provide a tortuous path, thereby permitting escape of gases but offering a certain amount of obstruction to the passage of electrolyte from the cell cavity. As shown, the vent is formed of an interconnected vertically extending section 31 and a horizontally extending section 32.

The elongated extension 24 of the cap 22 can be inserted into the top opening of the vertically extending section 31 of the vent thereby sealing the same, and, accordingly, preventing the escape of air from within the cell.

The cap 22 may be molded of hard rubber, a relatively rigid plastic material or a soft rubber with the elongated extension 24 being formed as an integral part of the cap.

As an alternate cap construction reference is made to Figure 4 which discloses a cap 40 provided with an internal recess 41. Secured in the recess is an insert 42 having the aforementioned elongated extension depending therefrom, as shown. In a structure of this type, cap 40 may be molded of any suitable material which results in a fairly rigid structure while the insert may be formed of the same material or a more resilient material as compared to the cap body.

The principal advantage of making the cap in the manner proposed by the alternate structure is that of eliminating certain difficulties which may be encountered in molding an integral cap and extension. If the extension and cap are formed as a single unit in a mold, there would be the possibility, with certain molding materials, of problems in molding due to the relatively heavy cross section of the solid cap.

If the aforementioned insert is rigid it may be secured in the recess by an appropriate solvent or cement, whereas if the insert is composed of a soft material it may be press fitted into the recess.

In operation, when it is desired to fill the cell with electrolyte or add distilled water to the cell, the cap 22 may be removed from the filling well 18 and its elongated extension 24 inserted into the opening of the vent 30. At this time the only opening of the cell to the atmosphere is that provided through the filling well 18. As electrolyte or distilled water is added to the cell its level will rise until it reaches approximately the bottom edge of the annular skirt 19 wherein further rise of the electrolyte level will be prevented by reason of the entrapment of the gases between the level of the electrolyte and the cell cover. At this point the electrolyte will begin to rise in the filling well indicating that the cell has been filled to a desired level.

When the cell has been adequately filled, the cap is removed from its temporary position in the vent opening and threadably secured in the filling well. When the vent is opened the excess electrolyte or distilled water in the filling well will seek a natural level in the cell. Any gases which form in the cell may be discharged through the tortuous vent, which, being of the construction that it is, will prevent egress of the electrolyte.

While I have shown and described certain embodiments of the invention it is understood that the invention is only to be limited by the scope of the following claims.

I claim:

1. In combination a cover for a storage battery, including a filling opening, an annular well surrounding said opening and extending downwardly from said cover a distance determined by the approximately upper level of electrolyte desired, an independently normally opened vent extending through a part of said cover removed from said well; and a cap detachably engageable with the upper portion of said annular well for normally sealing said filling opening, said cap being provided with a slender, cylindrical-like elongated pin depending from the bottom thereof having a cross sectional configuration substantially equal to the cross sectional configuration of the outer opening of said vent and substantially less than the cross sectional area of said filling opening, the lower end of said extension being adaptable for insertion into the outer opening of said vent upon removal of the cap from the filling opening whereby said vent may be sealed from the atmosphere and thereby limit the addition of fluids to a cell up to substantially the bottom of said annular well.

2. A structure as described in claim 1 wherein said elongated extension is formed as an insert which is secured in a downwardly opening recess in said cap.

3. A structure as described in claim 2 wherein said insert is composed of a relatively resilient material as compared to said cap.

References Cited in the file of this patent

UNITED STATES PATENTS

| | | |
|---|---|---|
| 1,163,992 | Ford | Dec. 14, 1915 |
| 1,285,658 | Ford | Nov. 26, 1918 |
| 2,106,222 | Matthew | Jan. 25, 1938 |
| 2,169,771 | Rolph | Aug. 15, 1939 |
| 2,220,005 | Smith | Oct. 29, 1940 |
| 2,491,162 | Christen | Dec. 13, 1949 |
| 2,506,952 | Doughty | May 9, 1950 |
| 2,631,182 | Hall et al. | Mar. 10, 1953 |
| 2,649,494 | Martin | Aug. 18, 1953 |

FOREIGN PATENTS

| | | |
|---|---|---|
| 735,659 | France | Sept. 6, 1932 |
| 618,332 | Great Britain | Feb. 21, 1949 |